US009236908B2

(12) United States Patent
Range et al.

(10) Patent No.: US 9,236,908 B2
(45) Date of Patent: Jan. 12, 2016

(54) OBSTRUCTION LIGHTING AND POWER LINE COMMUNICATION SYSTEM

(71) Applicant: SPX Corporation, Charlotte, NC (US)

(72) Inventors: Christopher Range, Franklin, TN (US); Russell Bruner, Franklin, TN (US)

(73) Assignee: SPX Corporation, Charlotte, NC (US)

( * ) Notice: Subject to any disclaimer, the term of this patent is extended or adjusted under 35 U.S.C. 154(b) by 17 days.

(21) Appl. No.: 14/175,222

(22) Filed: Feb. 7, 2014

(65) Prior Publication Data

US 2015/0229357 A1 Aug. 13, 2015

(51) Int. Cl.
*H04B 3/54* (2006.01)
*F21S 8/00* (2006.01)
*F21W 131/10* (2006.01)

(52) U.S. Cl.
CPC . *H04B 3/54* (2013.01); *F21S 8/003* (2013.01); *F21W 2131/10* (2013.01)

(58) Field of Classification Search
CPC ........ H04B 3/54; F21S 8/003; F21W 2131/10
See application file for complete search history.

(56) References Cited

U.S. PATENT DOCUMENTS

| 2005/0253689 | A1* | 11/2005 | Mollet et al. | 340/286.01 |
| 2006/0039698 | A1* | 2/2006 | Pautler et al. | 398/33 |
| 2007/0110192 | A1* | 5/2007 | Steiner | 375/343 |
| 2012/0274234 | A1* | 11/2012 | Campbell et al. | 315/294 |
| 2013/0293155 | A1* | 11/2013 | Campbell et al. | 315/307 |
| 2014/0012400 | A1* | 1/2014 | Hidaka et al. | 700/28 |

* cited by examiner

*Primary Examiner* — Jean B Corrielus
(74) *Attorney, Agent, or Firm* — Baker & Hostetler LLP

(57) ABSTRACT

An obstruction lighting and power line communication system is provided. The system includes a first controller coupled to and configured to control a first light source. The system includes a first transceiver associated with the first light source and configured to transmit and receive telemetry data signals associated with the first light source. The system includes a power line cable coupling the first controller and the first transceiver. The system includes a power supply coupled to the power line cable and configured to provide power to the first light source over the power line cable. The system includes a system controller configured to exchange control and telemetry signals with the first controller and the first transceiver over the power line cable.

18 Claims, 5 Drawing Sheets

OBSTRUCTION LIGHTING AND POWER LINE COMMUNICATION SYSTEM

FIELD OF THE DISCLOSURE

This disclosure is generally directed to an obstruction lighting system having a communication system, and more particularly to a power line communication system deployed in such an obstruction lighting system.

BACKGROUND

Many conventional obstruction lights, e.g., beacon lights, deployed in obstruction lighting systems are constructed utilizing incandescent bulbs, light emitting diodes, or other types of light sources. During the course of operation, it is desirable to monitor various parameters associated with such lights. Conventionally, maintenance personnel or technicians have to be physically near the obstruction light and manually obtain such parameters. This is problematic when the obstruction light is arranged at the top of a tall building or tower, exposing the maintenance personnel or technicians to hazardous conditions (e.g., height related issues, lightning, or harsh weather). Moreover, it is time consuming for maintenance personnel or technicians to directly inspect the obstruction lights. Some conventional obstruction lighting systems have wired communication lines separate from a power line cable for carrying power. However, having such extra wired lines for communication adds to the cost and complexity of the obstruction lighting system, as well as increases the vulnerability to interference and failure.

Accordingly, an obstruction lighting system is needed that reduces the costs of conventional obstruction lighting systems, reduces design complexity, and provides the benefits of a safe method and system to obtain working parameters of the obstruction light to the maintenance personnel or technicians without exposing them to the above-mentioned drawbacks.

SUMMARY OF THE DISCLOSURE

According to an aspect of the disclosure, an obstruction lighting and power line communication system is provided. The system includes a first controller coupled to and configured to control a first light source. The system includes a first transceiver associated with the first light source and configured to transmit and receive telemetry data signals associated with the first light source. The system includes a power line cable coupling the first controller and the first transceiver. The system includes a power supply coupled to the power line cable and configured to provide power to the first light source over the power line cable. The system includes a system controller configured to exchange control and telemetry signals with the first controller and the first transceiver over the power line cable.

According to a further aspect of the disclosure, a method of making an obstruction lighting and power line communication system is provided. The method includes providing a first controller coupled to and configured to control a first light source. The method includes providing a first transceiver associated with the first light source and configured to transmit and receive telemetry data signals associated with the first light source. The method includes providing a power line cable coupling the first controller and the first transceiver. The method includes providing a power supply coupled to the power line cable and configured to provide power to the first light source over the power line cable. The method includes providing a system controller configured to exchange control and telemetry signals with the first controller and the first transceiver over the power line cable.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced, as may be understood by one of ordinary skill in the art in view of the present disclosure. In the drawings.

DETAILED DESCRIPTION OF THE DISCLOSURE

Figure 1:
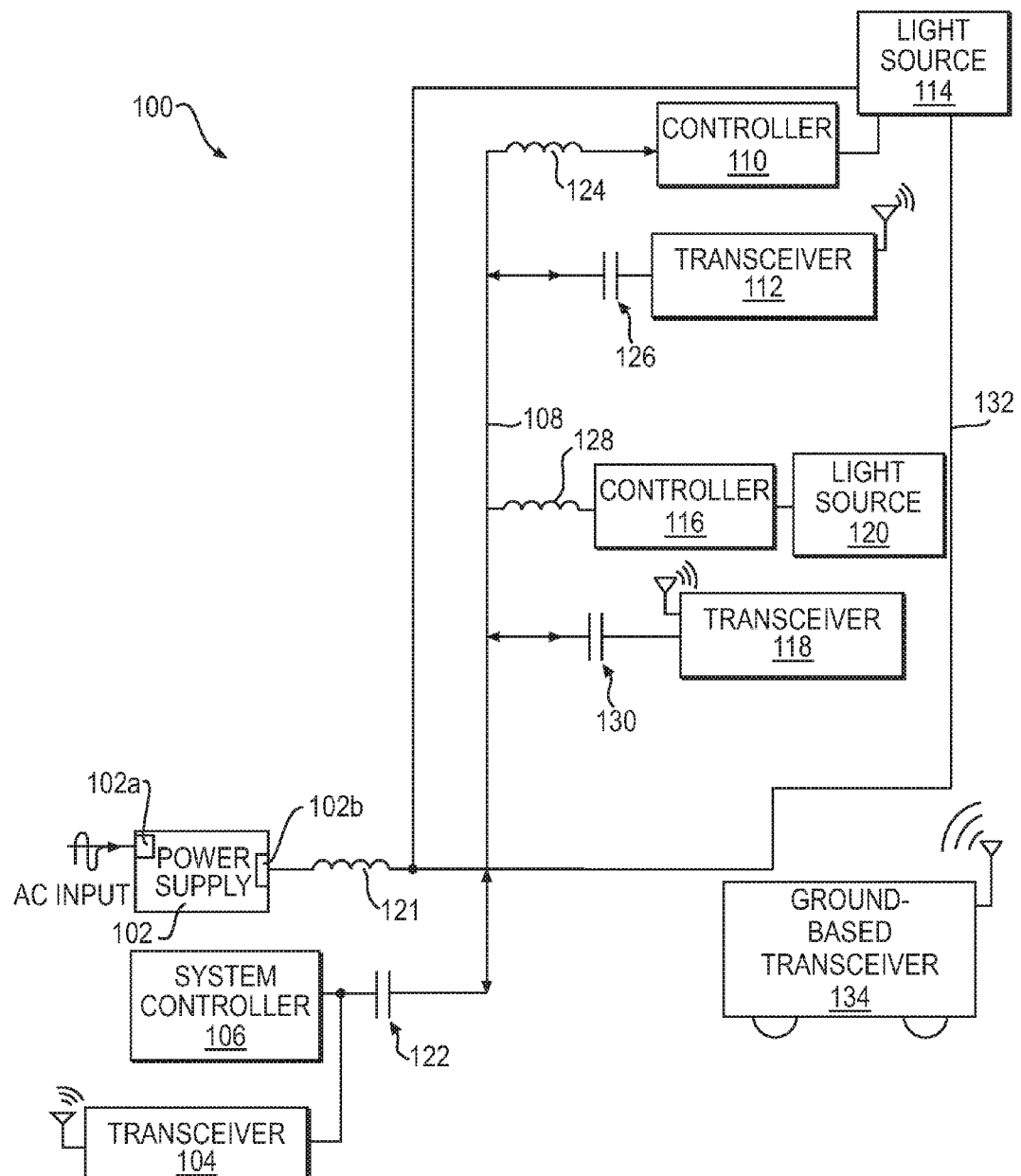
FIG. 1 illustrates an exemplary setup of an obstruction lighting and power line communication system, in accordance with an aspect of the disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings. The present disclosure uses designations such as "first," "second," "third," "fourth," "fifth," "sixth," etc., for various components. However, it may be understood by one of ordinary skill in the art that such designations are for the sole purpose of distinguishing between different components, and are not meant to indicate any priority, order, or particular importance to the component name following a particular designation.

FIG. 1 illustrates an exemplary setup of an obstruction lighting and power line communication system 100, in accordance with an aspect of the disclosure. The obstruction lighting and power line communication system 100 of FIG. 1 may include a power supply 102, a system controller 106, a power line cable 108, a first light source 114, a first transceiver 112, a third transceiver 104, a first controller 110, a first isolation impedance 121, a second isolation impedance 122, a third isolation impedance 124, and a fourth isolation impedance 126.

In some aspects, the obstruction lighting and power line communication system 100 of FIG. 1 may include a second transceiver 118, a second controller 116, a second light source 120, a fifth isolation impedance 128, and a sixth isolation impedance 130.

At least one of the power line cable 108, the first light source 114, the second light source 120, the first transceiver 112, the second transceiver 118, the first controller 110, the second controller 116, the first isolation impedance 121, the second isolation impedance 122, the third isolation impedance 124, the fourth isolation impedance 126, the fifth isolation impedance 128, and the sixth isolation impedance 130 are supported by a structure 132. In one aspect of the disclosure, the obstruction lighting and power line communication system 100 includes a ground-based transceiver 134. Although not explicitly shown in FIG. 1, the obstruction lighting and power line communication system 100 may include additional components, such as, but not limited to, a photo-sensing or photodiode unit to determine ambient light of the obstruction lighting and power line communication system 100, additional light sources with corresponding additional transceivers and controllers therefor, additional controllers, antennas, grounding wires or cables, grounding circuitry, lightning rods, heat sinks, cooling fans, safety interlock switches, housings or enclosures for various components, switching regulators, power factor correctors, communication cables, mechanical platforms or bases for various components, modems, one or more wireless geo-positioning devices (e.g., Global Positioning System devices or GPS devices) with corresponding antennas, cellular communications antennas, reflectors and passive optical components for reflecting incident light, a foundation to support the structure 132, and the like.

In one aspect, the obstruction lighting and power line communication system 100 may have only the first light source 114. Alternatively, the obstruction lighting and power line communication system 100 may have light sources in addition to the first light source 114 and the second light source 120. Such additional light sources may be located at different positions relative to the first light source 114 and the second light source 120. For example, such additional light sources may be positioned at regular intervals between the second light source 120 and a base of the structure 132 near a ground level, but above the base at a predetermined height from the base. Further by way of example only and not by way of limitation, the obstruction lighting and power line communication system 100 may be a Catenary lighting system having three levels (tiers) of lights. One tier is installed at each of the following three locations: at a highest point or top of the structure 132, a lower point of the structure 132 (above the ground level), and half-way between the upper and lower levels of the structure 132. Each level may be lit to provide 360-degree coverage. In one aspect, a flash rate of 60 flashes per minute may be used for the light sources with an exemplary flash sequence of middle-top-bottom for the Catenary lighting system.

In one aspect, one or more components of the obstruction lighting and power line communication system 100 may be combined into an integrated unit or a single box inside a protective housing. For example, the power supply 102, the system controller 106, and the third transceiver 104 may be combined as a single unit, with the power supply 102 providing power to the system controller 106 and the third transceiver 104. Likewise, the first controller 110, the first transceiver 112 and the second controller 116, the second transceiver 118 may be combined into respective single units, as may be understood by one of ordinary skill in the art in view of this disclosure.

In one aspect, the power supply 102 is coupled to the power line cable 108 via the first isolation impedance 121. Alternatively, the power supply 102 may be directly connected to the power line cable 108, or may have additional impedances connecting the power supply 102 to the power line cable 108. In one aspect, the system controller 106 and the third transceiver 104 are coupled to the power line cable 108 via the second isolation impedance 122. Alternatively, the system controller 106 and/or the third transceiver 104 may be directly connected to the power line cable 108, or may have additional impedances connecting the system controller 106 and/or the third transceiver 104 to the power line cable 108. In one aspect, the power supply 102, the third transceiver 104, and the system controller 106 are at a ground or terrestrial level, or are at a lowest height of the structure 132 with respect to the other components of the obstruction lighting and power line communication system 100.

In one aspect, the first controller 110 is coupled to the power line cable 108 via the third isolation impedance 124. Alternatively, the first controller 110 may be directly connected to the power line cable 108, or may have additional impedances connecting the first controller 110 to the power line cable 108. In one aspect, the first transceiver 112 is coupled to the power line cable 108 via the fourth isolation impedance 126. Alternatively, the first transceiver 112 may be directly connected to the power line cable 108, or may have additional impedances connecting the first transceiver 112 to the power line cable 108. In one aspect, the first controller 110 and the first transceiver 112 are located substantially at a highest point of the structure 132, near or right below the first light source 114, which is at the highest point of the structure 132.

In one aspect, the second controller 116 is coupled to the power line cable 108 via the fifth isolation impedance 128. Alternatively, the second controller 116 may be directly connected to the power line cable 108, or may have additional impedances connecting the second controller 116 to the power line cable 108. In one aspect, the second transceiver 118 is coupled to the power line cable 108 via the sixth isolation impedance 130. Alternatively, the second transceiver 118 may be directly connected to the power line cable 108, or may have additional impedances connecting the second transceiver 118 to the power line cable 108. In one aspect, the second controller 116 and the second transceiver 118 are located below the first light source 114, near the second light source 120, which is also below the first light source 114, although there may be additional light sources between the first light source 114 and the second light source 120.

In one aspect, the power supply 102 may include an input port 102a configured to receive input mains supply power. For example, the input port 102a may receive a 120V or a 240V alternating current (AC) power from a mains power supply grid at 50 Hz or 60 Hz depending upon a geographical location, a distance from a power station, and/or the number of system controllers of the obstruction lighting and power line communication system 100. The power supply 102 may include protection circuitry such as surge protectors (e.g., metal oxide varistors), fuses, ground fault interrupt devices, and the like to prevent damage to the obstruction lighting and power line communication system 100 from various transients. In one aspect, to optimize design or control heating or cooling, the power supply 102 may include two or more separate power supplies. The power supply 102 is configured to convert input AC power into output direct current (DC) power. Such DC power is output at an output port 102b. The output port 102b may be coupled to the first isolation impedance 121, as illustrated in FIG. 1 by way of example only. In one aspect, the converted DC power output at the output port 102b may be at 60V, although other values of DC power may be used, e.g., 24V, 48V, etc. The DC power is provided to the power line cable 108 and thus to various other components of the obstruction lighting and power line communication system 100, e.g., the first light source 114, the second light source 120, the first transceiver 112, the second transceiver 118, the first controller 110, and/or the second controller 116. In one aspect, the power supply 102 may include full-wave and/or half-wave rectifiers configured to convert AC to DC, as known to one of ordinary skill in the art. In one aspect, the power supply 102 may include step-down transformers to convert the input supply voltage of 120V or 240V to a lower value of 60V, 24V, 48V, or other lower values, which are then output at the output port 102b.

In one aspect, the system controller 106 is configured as a control unit for providing overall system control for the obstruction lighting and power line communication system 100. The system controller 106 may output control signals to be sent over the power line cable 108 to different components of the obstruction lighting and power line communication system 100. By way of example only, such control signals may include mode control (day or night), synchronization signals, alarm collection and notification, or combinations thereof. In one aspect, the system controller 106 may be configured to communicate with other system controllers of other obstruction lighting and power line communication systems (not shown) via the third transceiver 104.

Figure 2:
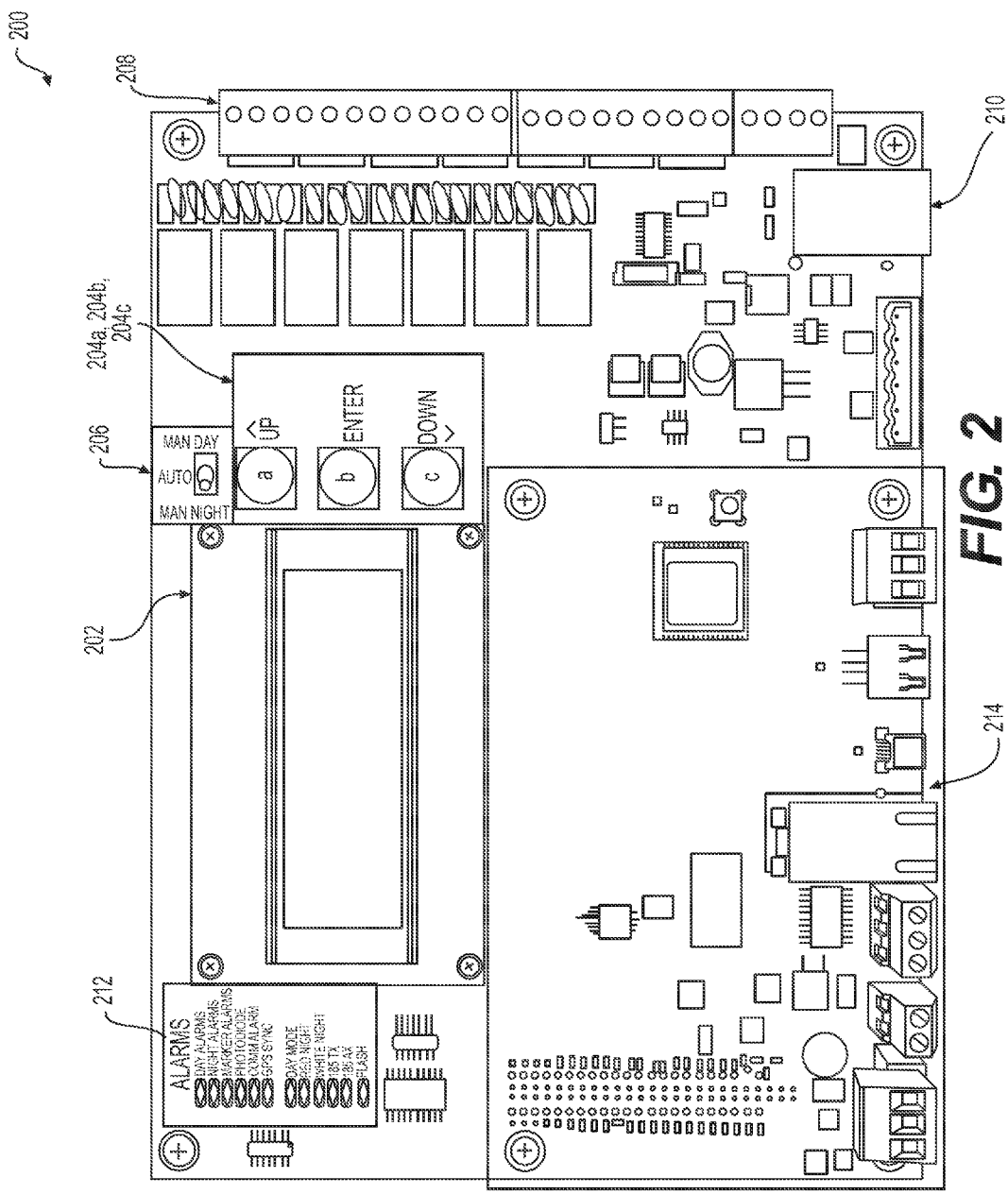
FIG. 2 illustrates a system controller of the obstruction lighting and power line communication system of FIG. 1, in accordance with an aspect of the disclosure.

In one aspect, the system controller 106 includes a printed circuit board (PCB) 200 shown in FIG. 2. The printed circuit board 200 may include a display 202, a control interface 204 to allow a technician or a user to interact with the display 202, a manual override switch 206, one or more alarm interface connections 208, a communications port 210, one or more status indicators 212, and a microprocessor unit 214, in addition to other circuitry such as internal buses, filters, amplifiers, GPS controller chip, heat sinks, ground circuitry, batteries, etc. In one aspect, the PCB 200 of the system controller 106 may include the third transceiver 104 integrated thereupon. In one aspect, the system controller 106 may be coupled to an antenna (not shown) configured to wirelessly transmit and receive various control and telemetry signals for the first light source 114 and/or the second light source 120.

In one aspect, the display 202 may be a multi-line organic LED (OLED) display, although other types of displays such as liquid crystal displays (LCDs) could be used. The display 202 provides system status, alarm and programming information, and the like to a user of the system controller 106. In one aspect, a control interface 204 may be coupled to the display 202 for a user to interact with the display 202. The control interface 204 may include three pushbuttons 204a, 204b, and 204c to provide the user interface for the system controller 106, although other numbers of push buttons or other types of interactive devices may be used. In one aspect, the top pushbutton 204a and bottom pushbutton 204c move a cursor position up and down on the display 202. The center pushbutton 204b may be used to select a menu item from the display 202.

In one aspect, the printed circuit board 200 includes the manual override switch 206. When the manual override switch 206 is moved to either "MAN-DAY" or "MAN-NIGHT" position corresponding to daytime or nighttime, respectively, the display 202 reads "M-DAY" or "MNIGHT" and a corresponding mode LED blinks on the one or more status indicators 212. For example, a manual mode on the system controller 106 may expire 30 minutes after initiating the mode override. Each change to the manual mode switch may restart the 30 minute timer. The manual override switch 206 may be moved after power up to activate mode override.

In one aspect, the printed circuit board 200 includes the one or more alarm interface connections 208 that are dry contact alarm connections. Each contact in the one or more alarm interface connections 208 may be wired as normally open or normally closed. The one or more alarm interface connections 208 may communicate with other components of the obstruction lighting and power line communication system 100 such as the first light source 114 and the second light source 120 over the power line cable 108 to obtain various alarms associated with such components of the obstruction lighting and power line communication system 100. For example, the one or more alarm interface connections 208 may obtain telemetry signals pertaining to day or night mode of the obstruction lighting and power line communication system 100, a communication failure of the obstruction lighting and power line communication system 100 or of components thereof, etc.

In one aspect, the printed circuit board 200 includes the communications port 210 for the system controller 106 to communicate with other system controllers. For example, the communications port may include one or more RJ-45 type connectors for daisy-chain communication between the system controller 106 with the first controller 110, the second controller 116, and/or other system controllers.

In one aspect, the printed circuit board 200 includes the one or more status indicators 212 provided for immediate visual reference of the current status of the system controller 106. For example, the one or more status indicators 212 may include an LED in red color to indicate a failure of the first light source 114 and/or the second light source 120 to operate in a daytime mode or a night time mode, a communication status, an LED in green color to indicate that all components of the obstruction lighting and power line communication system 100 are working properly, etc.

In one aspect, the printed circuit board 200 includes a microprocessor unit 214 configured to process various signals received at or transmitted from the system controller 106. For example, the microprocessor unit 214 may include a GPS processor, an antenna signal processor, an Ethernet connector, memory units, synchronization circuitry, amplifiers, filters, and other signal processing circuitry, buses (e.g., I$^2$C buses), address registers for addressing various components of the system controller 106, RS-232 connectors for communications, modulators, demodulators, and the like.

Figure 4:
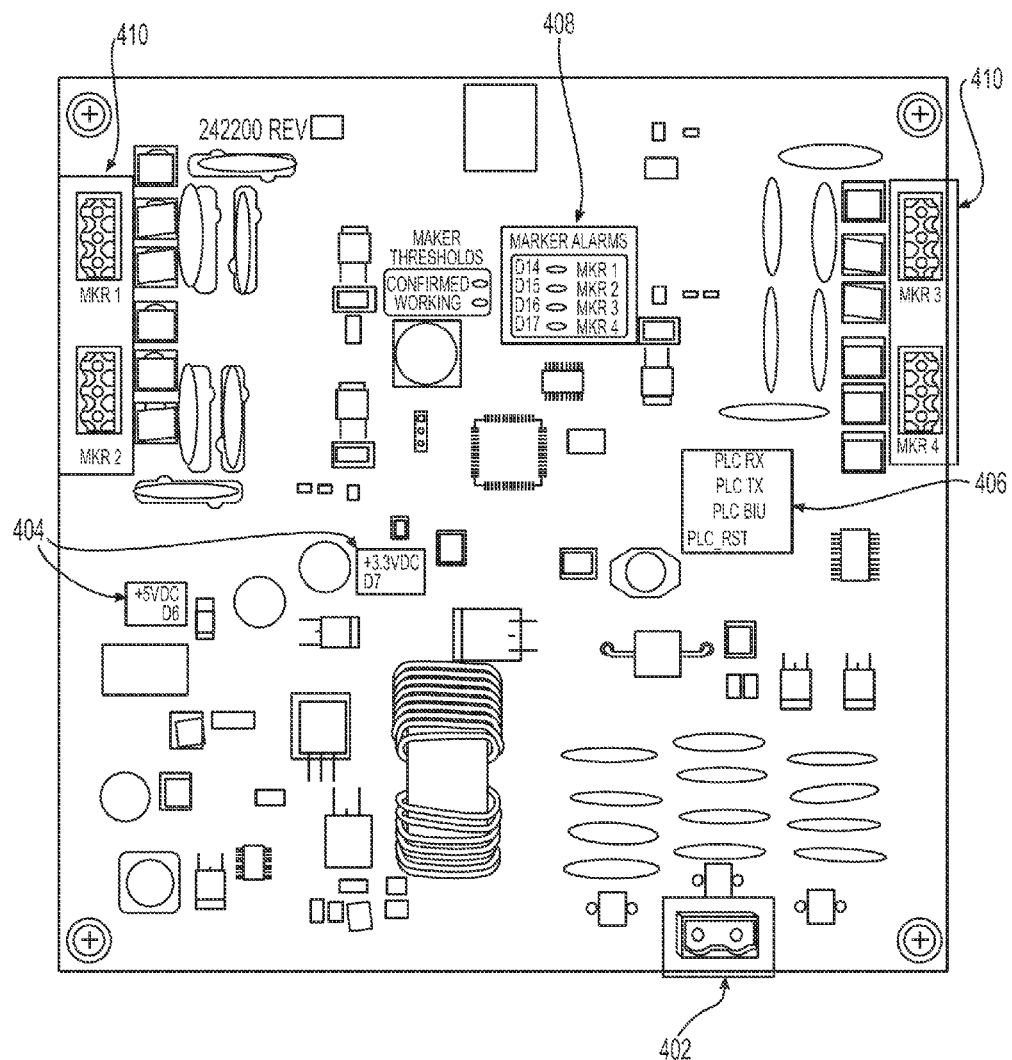
FIG. 4 illustrates an exemplary controller associated with the obstruction lighting and power line communication system of FIG. 1, in accordance with an aspect of the disclosure.

In one aspect, the first controller 110 and the second controller 116 are configured to control power into the first light source 114 and the second light source 120. The first controller 110 and the second controller 116 may be physically attached directly to an input of the first light source 114 and the second light source 120, respectively. As illustrated in FIG. 4, in one aspect, the first controller 110 and the second controller 116 may each include an input power port 402, a voltage status indicator 404, an alarm 408, and an output port 410, in addition to other electronic circuitry similar to the system controller 106. The input power port 402 may input DC power from the power line cable 108, and may feed it to a DC-DC converter (not shown) to bring the voltage to an appropriate level (e.g., 3.3V, 5V, etc.). The voltage status indicator 404 may provide voltage level information during setup or maintenance of the first light source 114 and the second light source 120. The alarm 408 may be an LED configured to provide an indication of proper functioning of the first light source 114 and/or the second light source 120. The output port 410 may be configured to communicate telemetry data signals to the system controller 106, the first transceiver 112, the second transceiver 118, and/or the third transceiver 104 over the power line cable 108. In one aspect, the first transceiver 112 and/or the second transceiver 118 may be configured to communicate the signals from the output port 410 to the ground-based transceiver 134 and/or the system controller 106 wirelessly.

The first light source 114 and the second light source 120 may each include one or more light emitting diodes (LEDs) or arrays of LEDs. Alternatively or additionally, the first light source 114 and the second light source 120 may be an inert gas light source such as a Xenon based light source. By way of example only, the first light source 114 and the second light source 120 may be VANGUARD™ LED series light sources provided by Flash Technology of Franklin, Tenn. As such, the first light source 114 and the second light source 120 may be designed to have performance specifications in compliance with aviation authorities such as the Federal Aviation Authority (FAA). Various operational parameters for such FAA compliant lighting systems are known to one of ordinary skill in the art and will not be described herein. For example, such parameters may include telemetric data pertaining to flash intensity (day/night), flash rate (day/night), power consumption, power output, luminosity, temperature (ambient and of the first light source 114 and/or the second light source 120), voltage, current, LEDs out, run time, etc. The telemetric data may be collected by the controllers 110, 116 utilizing various sensor types including photodiodes, thermistors, voltage sensors, current sensors, thermocouples, and the like. Each of the sensor types may include power sources, analog to digital converters, conversion circuits, registers to store the sensed values and the like.

In one aspect, the first light source 114 is a beacon light source and the second light source 120 is a marker light source located below the first light source 114 or the beacon light source. As discussed, additional marker light sources may be present in the obstruction lighting and power line communication system 100 along with, above, and/or below the second light source 120. In one aspect, the first light source 114 and/or the second light source 120 may output primarily white light. Alternatively, in one aspect the first light source 114 and/or the second light source 120 may output primarily red light. Further, in one aspect, the first light source 114 and/or the second light source 120 may output a sequence of primarily white light and red light, although other wavelengths of light (e.g., blue) may be outputted. For example, the first light source 114 and/or the second light source 120 may output primarily white light during the day and red light during night or low visibility conditions. In one aspect, the first light source 114 and/or the second light source 120 are configured to receive DC power from the power line cable 108 via the first controller 110 and the second controller 116, respectively, coupled thereto. In one aspect, the first light source 114 and/or the second light source 120 is arranged to generate a 360° horizontal beam pattern and a predetermined vertical beam pattern.

The first transceiver 112 and the second transceiver 118 may each include one or more antennas, filters, modulators, demodulators, and other electronic circuitry. The first transceiver 112 and the second transceiver 118 are each coupled to one or more sensors (not shown) associated with the first light source 114 and the second light source 120, respectively. The first transceiver 112 and the second transceiver 118 may each process various telemetry data signals received from such sensors and may wirelessly transmit them to the ground-based transceiver 134 and/or the third transceiver 104 associated with the system controller 106. Such wireless transmission of telemetry data signals results in eliminating or reducing the need for maintenance personnel to climb up the structure 132 to obtain telemetry data. Likewise, the third transceiver 104 is configured to receive and transmit control ad telemetry signals wirelessly to the ground-based transceiver 134 and to the first transceiver 112 and/or the second transceiver 118.

Figure 3:
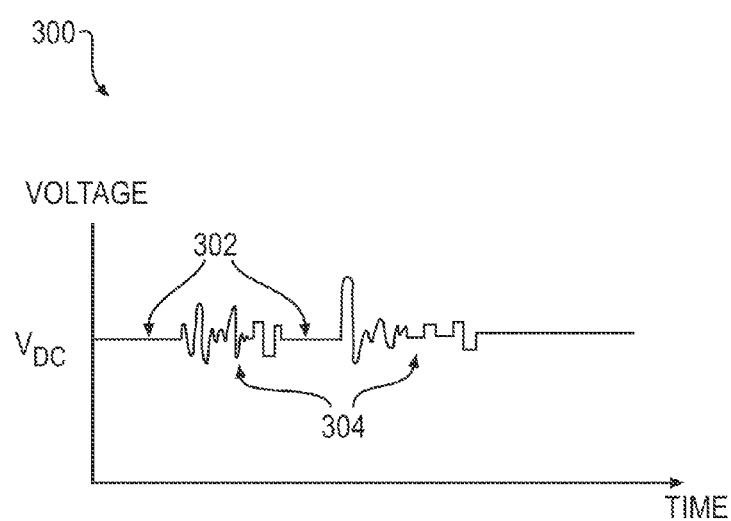
FIG. 3 illustrates an exemplary plot of signals carried by a power line cable of the obstruction lighting and power line communication system of FIG. 1, in accordance with an aspect of the disclosure.

The power line cable 108 runs from the power supply 102 all the way up to the first light source 114 along the structure 132. The power line cable 108 is designed to carry DC power (e.g., 60V DC) as well as modulated control and telemetry signals to and from the system controller 106 and the first controller 110 and the second controller 116. In one aspect, the power line cable 108 may be able to transmit the modulated signals at a predetermined bandwidth or data rate. Such signals on the power line cable 108 are in addition to or are multiplexed with DC power signals from the power supply 102. In one aspect, the modulated signals may be output by the first transceiver 112, the second transceiver 118, and/or the third transceiver 104, superimposed upon the DC power signal from the power supply 102, as illustrated in FIG. 3 by way of example only. For example, the modulated signal may include control and telemetry signals, telemetry data signals (in digital format), for the first light source 114 and the second light source 120. The power line cable 108 includes an outer insulation covering and an inner conductor of suitable gauge and material. The power line cable 108 may be secured at regular or random intervals along a length thereof to the structure 132. Such securing may utilize strong tape material (e.g., insulating duct tape), clamps, screws, etc., as known to one of ordinary skill in the art.

In one aspect, the first isolation impedance 121, the third isolation impedance 124, and the fifth isolation impedance 128 are each inductors. As a result, the first isolation impedance 121, the third isolation impedance 124, and the fifth isolation impedance 128 substantially prevent any AC component from the system controller 106, the first controller 110, and/or the second controller 116 to enter the power supply 102. It is to be noted that although the first isolation impedance 121, the third isolation impedance 124, and the fifth isolation impedance 128 are illustrated as single elements in FIG. 1, the first isolation impedance 121, the third isolation impedance 124, and the fifth isolation impedance 128 may be a plurality or a network of impedances having an overall equivalent impedance, as may be understood by one of ordinary skill in the art in view of this disclosure.

In one aspect, the second isolation impedance 122, the fourth isolation impedance 126, and the sixth isolation impedance 130 are each capacitors. The second isolation impedance 122, the fourth isolation impedance 126, and the sixth isolation impedance 130 are configured to isolate the third transceiver 104, the first transceiver 112, and the second transceiver 118, respectively, from any DC components from the power supply 102. In one aspect, the second isolation impedance 122 is configured to further block any DC components from entering the system controller 106. It is to be noted that although the second isolation impedance 122, the fourth isolation impedance 126, and the sixth isolation impedance 130 are illustrated as single elements in FIG. 1, the second isolation impedance 122, the fourth isolation impedance 126, and the sixth isolation impedance 130 may be a plurality or a network of impedances having an overall equivalent impedance, as may be understood by one of ordinary skill in the art in view of this disclosure.

The structure 132 may be a tower (e.g., a communications tower), a wind-turbine, a factory chimney, a cooling tower, a tall or high-rise building, or a tower atop a building, or other elevated structures known to one of ordinary skill in the art. For example, the structure 132 may be part of a repeater station for a cellular network or other type of communication network. Further by way of example only, the structure 132 may be made of metal, composite material, concrete or other rigid material capable of supporting various components of the obstruction lighting and power line communication system 100. Generally, the obstruction lighting and power line communication system 100 may be installed at any structure that needs to be visible to flying aircraft or helicopters for warning or alerting the pilot of such flying aircraft or helicopters about a presence of the structure 132. Further, the structure 132 is arranged to physically support the power line cable 108, along with the first light source 114, the first controller 110, the first transceiver 112, the second light source 120, the second transceiver 118, the third isolation impedance 124, the fourth isolation impedance 126, the fifth isolation impedance 128, and/or the sixth isolation impedance 130. As may be understood by one of ordinary skill in the art in view of this disclosure, although not explicitly shown, the structure 132 may support additional hardware including but not limited to antennas, housings, other cables (e.g., grounding cables), lightning rods, etc.

Referring to FIG. 3, an example plot 300 illustrating a DC power signal 302 and control and telemetry signals 304 (offset by the DC power signal 302) on the power line cable 108. In one aspect, the control and telemetry signals 304 are provided on the power line cable 108 with the DC power signal 302 cut off on the power line cable 108. In this scenario, the power supply 102 configured to provide the DC power signal 302 (e.g., having a 60V level) is cut-off or isolated from the power line cable 108 by the first isolation impedance 121, or other additional cut-off impedances or switches (not shown). In one aspect, the control and telemetry signals 304 may carry telemetry data signals thereupon in analog or digital format. Such telemetry data signals may include data related to flash or blink rate of the first light source 114 and/or the second light source 120, a control signal to turn on or turn off the first light source 114 and/or the second light source 120, a control signal to indicate to the first controller 110 and/or the second controller 116 a time of the day or night, a temperature of the ambient environment, a humidity level of the ambient environment, a time since the system controller 106, the first controller 110 and/or the second controller 116 were rebooted, an intensity level at which light is output from the first light source 114 and/or the second light source 120, a status of various LEDs of the first light source 114 and/or the second light source 120, a communication link status for the first transceiver 112, the second transceiver 118, and/or the third transceiver 104 with respect to each other and/or with respect to the ground-based transceiver 134, header and a trailer packet, and/or digital packets or a payload according to the protocol being used to communicate over the power line cable 108. For example, the control and telemetry signals 304 may include 6-7 messages relating to the above-noted examples of telemetry data signals, a hardware address for each of the power supply 102, the system controller 106, the first controller 110, the second controller 116, the first transceiver 112, the second transceiver 118, and the third transceiver 104, in addition to other telemetry data. In one example, such communication over the power line cable 108 may be at 31 bytes/second, although other values based on the physical data carrying capacity of the power line cable 108 could be used. In one aspect, the control and telemetry signals 304 may include information related to a master-slave status of the different components of the obstruction lighting and power line communication system 100. For example, the system controller 106 may be preset as the master controller with the first controller 110 and/or the second controller 116 as slave controller(s). Likewise, the system controller 106 itself may be a slave controller to an external or another controller of a different obstruction lighting and power line communication system (not shown). Further, the control and telemetry signals 304 may include data packets associated with how the power supply 102, the system controller 106, the first controller 110, the second controller 116, the first transceiver 112, the second transceiver 118, and the third transceiver 104 are polled (e.g., daisy-chained) or get to use the power line cable 108 (e.g., via a time-division multiplexing (TDM) scheme, etc.). In a particular aspect, one or more of the system controller 106, the first controller 110, the second controller 116, the first transceiver 112, the second transceiver 118, and the third transceiver 104 may be implemented utilizing a power line communication board.

Figure 5:
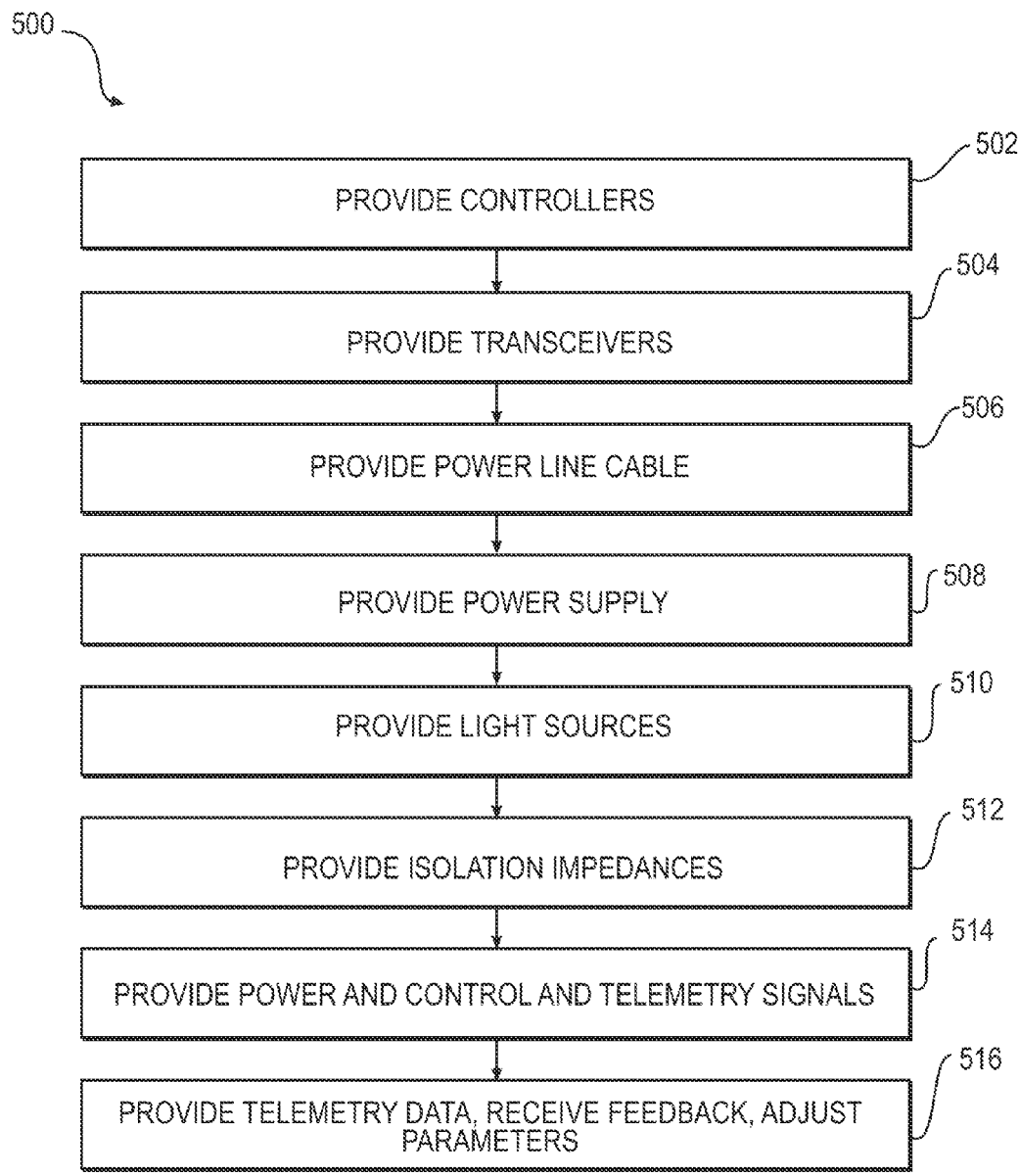
FIG. 5 illustrates a method of making the obstruction lighting and power line communication system of FIG. 1, in accordance with an aspect of the disclosure.

FIG. 5 illustrates a flowchart of a method 500 of making the obstruction lighting and power line communication system 100, in accordance with an aspect of the disclosure. The method 500 may be provided by way of example only to manufacture, make, arrange, implement or assemble the obstruction lighting and power line communication system 100, as there are a variety of ways to manufacture, make, arrange, implement or assemble the obstruction lighting and power line communication system 100. The method 500 shown in FIG. 5 can be executed or otherwise performed by one or a combination of various systems. Each block shown in FIG. 5 represents one or more processes, methods or subroutines carried out in the exemplary method 500.

In one aspect, one or more processes or operations in the method 500 may be carried out by a manufacturer of the obstruction lighting and power line communication system 100 using tools and/or technicians. Further, one or more processes may be skipped or combined as a single process, repeated several times, and the flow of processes in the method 500 may be in any order not limited by the specific order illustrated in FIG. 5. For example, various operations of the method 500 may be moved around in terms of their respective orders, or may be carried out in parallel with one or more processes.

Referring to FIG. 5, the method 500 may begin in an operation 502. In the operation 502, the first controller 110, the second controller 116, and the system controller 106 are provided. Specifically, the operation 502 includes providing the first controller 110 coupled to and configured to control the first light source 114, providing the second controller 116 coupled to and configured to control the second light source 120, and providing the system controller 106 configured to exchange control and telemetry signals with the first controller 110 and the second controller 116 over the power line cable 108.

In an operation 504, the first transceiver 112, the second transceiver 118, and the third transceiver 104 are provided. Specifically, the operation 504 may include providing the first transceiver 112 associated with the first light source 114 and configured to transmit and receive telemetry data signals associated with the first light source 114, providing the second transceiver 118 associated with the second light source 120 and configured to transmit and receive telemetry signals associated with the second light source 120. In one aspect, the operation 504 includes coupling the system controller 106 to the third transceiver 104 such that the system controller 106 may be configured to exchange control and telemetry signals with the third transceiver 104. In one aspect, in the operation 504, the first transceiver 112, the second transceiver 118, and the third transceiver 104 are configured to exchange control and telemetry signals with the system controller 106.

In an operation 506, the power line cable 108 may be provided coupling the first controller 110 and the first transceiver 112, coupling the second controller 116 and the second transceiver 118, coupling the power supply 102 and the system controller 106 to the first controller 110 and the first transceiver 112 and the second controller 116 and the second transceiver 118, as illustrated in and discussed with respect to FIG. 1. In one aspect, the power line cable 108 may be provided to couple to the third transceiver 104, also illustrated in and discussed with respect to FIG. 1.

In an operation 508, the power supply 102 is provided coupled to the power line cable 108 and configured to provide power to the first light source 114 over the power line cable 108. In one aspect, the power supply 102 is provided to provide power to the second light source 120 over the power line cable 108. In one aspect, the power supply 102 is configured to power other components of the obstruction lighting and power line communication system 100, e.g., the system controller 106, the first transceiver 112, the second transceiver 118, over the power line cable 108.

In an operation 510, the first light source 114 and the second light source 120 are provided. By way of example only, the first light source 114 is provided and arranged above the second light source 120 on the structure 132. At least in this respect, the first light source 114 is provided as a beacon light and the second light source 120 is provided as a marker light, with the beacon light being at a top most point of the structure 132. In one aspect, the operation 510 may include providing additional light sources.

In an operation 512, the first isolation impedance 121, the second isolation impedance 122, the third isolation impedance 124, the fourth isolation impedance 126, the fifth isolation impedance 128, and the sixth isolation impedance 130 are provided at respective couplings to the power line cable 108, as illustrated in FIG. 1. Specifically, providing the isolation impedances may include providing resistors, capacitors, inductors, impedance networks, and/or combinations thereof, coupled to the power line cable 108 as illustrated in FIG. 1.

In an operation 514, AC power from the mains supply (not shown) may be provided as an input power at the input port 102a of the power supply 102. Such AC power may then be converted to the DC power signal 302 by the power supply 102 and output to the power line cable 108. In one aspect, providing the DC power to the power line cable 108 may occur during a testing phase of the obstruction lighting and power line communication system 100. In one aspect, providing the DC power to the power line cable 108 may occur during normal operation of the obstruction lighting and power line communication system 100, e.g., after the testing phase.

In one aspect, in addition to the DC power, the control and telemetry signals 304 may be added to the DC power signal 302 such that the power line cable 108 can then simultaneously provide DC power to the various components of the obstruction lighting and power line communication system 100, as well as provide or exchange control and telemetry data in the control or telemetry signals 304 that are offset by the DC power signal 302, as also illustrated in and discussed with respect to FIG. 3.

In an operation 516, the method 500 may include wirelessly transmitting, from the first transceiver 112 and/or the second transceiver 118 and/or the third transceiver 104, the telemetry data signals to the ground-based transceiver 134. The ground-based transceiver 134 may be located in a vehicle with additional signal processing and analysis circuitry to analyze the transmitted signals. Such analysis may include monitoring various telemetry information associated with the obstruction lighting and power line communication system 100. For example, the ground-based transceiver 134 may include an antenna that wirelessly receives the control and telemetry signals 304 from the obstruction lighting and power line communication system 100 and forwards the control and telemetry signals 304 to an on-board computer for analysis. In response, the ground-based transceiver 134 may send one or more feedback signals to the first transceiver 112, the second transceiver 118 and/or the third transceiver 104. Such one or more feedback signals may be received, at the first transceiver 112 and/or the second transceiver 118 and/or the third transceiver 104. The received one or more feedback signals may be forwarded to the system controller 106, the first controller 110, and/or the second controller 116, and may be used for adjusting one or more properties of the first light source 114 and/or the second light source 120 based upon the one or more feedback signals. For example, various telemetric parameters associated with the first light source 114 and/or the second light source 120 such as blink rate, output luminosity, output color, etc., as discussed may be adjusted. The control and telemetry signals 304 may be modified based upon the received feedback signals to change such parameters associated with the first light source 114 and/or the second light source 120. In one aspect, properties of components other than the first light source 114 and/or the second light source 120 may be adjusted based upon the feedback signal. For example, power carried by the power line cable 108 may be adjusted for day or night time operation of the obstruction lighting and power line communication system 100.

The method 500 may include additional operations not explicitly discussed with respect to FIG. 5 but inherent in view of the overall disclosure. For example, the method 500 may include providing or building the structure 132, conducting one or more tests for the different components of the obstruction lighting and power line communication system 100, and communicating wirelessly with the ground-based transceiver 134 via one or more of the first transceiver 112, the second transceiver 118, and the third transceiver 104, or over a wired channel (e.g., the power line cable 108). The method 500 may include operations related to obtaining telemetry data signals for proper operation or functioning of the first light source 114, the second light source 120, and/or other components of the obstruction lighting and power line communication system 100. An exemplary advantage of the obstruction lighting and power line communication system 100 or of using the obstruction lighting and power line communication system 100 is that due to the power line cable 108 carrying both the DC power (over the DC power signal 302) as well as the control and telemetry signals 304, maintenance personnel do not have to climb the structure 132. As a result, the obstruction lighting and power line communication system 100 is safer than conventional system, utilizes less hardware than conventional systems, and allows maintenance personnel to inspect the system in an efficient manner. Accordingly, installation, operational and maintenance costs for the obstruction lighting and power line communication system 100 are lower than conventional systems, although other advantages exist for the obstruction lighting and power line communication system 100 over the conventional systems, as may be understood by one of ordinary skill in the art in view of the present disclosure.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the disclosure has been described in terms of exemplary aspects, those skilled in the art will recognize that the disclosure can be practiced with modifications in the spirit and scope of the appended claims. The examples given above are merely illustrative and are not meant to be an exhaustive list of all possible designs, aspects, applications or modifications of the disclosure.

What is claimed is:

1. An obstruction lighting and power line communication system, comprising:
   a first controller coupled to and configured to control a first light source;
   a first transceiver associated with the first light source and configured to transmit and receive telemetry data signals associated with the first light source;
   a power line cable coupling the first controller and the first transceiver;
   a power supply coupled to the power line cable and configured to provide power to the first light source over the power line cable;
   a system controller configured to exchange at least one of a control signal and a telemetry signal with the first controller over the power line cable;
   a second controller coupled to and configured to control a second light source;
   a second transceiver associated with the second light source and configured to transmit and receive telemetry data signals associated with the second light source, the power line cable coupling the second controller and the second transceiver, the power supply configured to provide power to the second light source over the power line cable, and the system controller configured to exchange at least one of an additional control signal and an additional telemetry signal with the second controller;
   a first isolation impedance coupled to the power line cable between the power supply and the power line cable, the first isolation impedance configured to isolate the power supply when the system controller provides at least one control and telemetry signal to at least one of the first and the second light sources; and
   a second isolation impedance coupled to the power line cable between the system controller and the power line cable, the second isolation impedance configured to isolate the system controller.

2. The obstruction lighting and power line communication system of claim 1, wherein the first light source is a beacon light source and the second light source is a marker light source.

3. The obstruction lighting and power line communication system of claim 2, wherein the beacon light source is arranged above the marker light source in a fixed structure supporting the power line cable.

4. The obstruction lighting and power line communication system of claim 1, wherein the system controller is coupled to a third transceiver, said second isolation impedance being a capacitor configured to isolate the third transceiver from the power supply.

5. The obstruction lighting and power line communication system of claim 1, wherein the control and telemetry signals include at least one of:
   a voltage level, a current level, a temperature level, a flash rate, an intensity level, and a day or night status indicator associated with at least one of the first and the second light sources.

6. The obstruction lighting and power line communication system of claim 1 further comprising:
   a third isolation impedance coupled between the first controller and the power line cable;
   a fourth isolation impedance coupled between the first transceiver and the power line cable;
   a fifth isolation impedance coupled between the second controller and the power line cable; and
   a sixth isolation impedance coupled between the second transceiver and the power line cable.

7. The obstruction lighting and power line communication system of claim 1, wherein the power line cable is configured to carry direct current (DC) power to the first light source.

8. The obstruction lighting and power line communication system of claim 1, wherein the first transceiver is configured to wirelessly transmit the telemetry data signals to a ground-based transceiver.

9. A method of operating an obstruction lighting and power line communication system, the method comprising:
providing a first controller coupled to and configured to control a first light source;
providing a first transceiver associated with the first light source and configured to transmit and receive telemetry data signals associated with the first light source;
providing a power line cable coupling the first controller and the first transceiver;
providing a power supply coupled to the power line cable and configured to provide power to the first light source over the power line cable;
providing a system controller configured to exchange at least one of a control signal and a telemetry signal with the first controller over the power line cable;
wirelessly transmitting, from the first transceiver, the telemetry data signals to a ground based transceiver;
receiving, at the first transceiver, one or more feedback signals based upon an analysis of the telemetry data signals; and
adjusting one or more properties of the first light source based upon the one or more feedback signals.

10. The method of claim 9 further comprising:
providing a second controller coupled to and configured to control a second light source; and
providing a second transceiver associated with the second light source and configured to transmit and receive telemetry data signals associated with the second light source, the power line cable coupling the second controller and the second transceiver, the power supply configured to provide power to the second light source over the power line cable, and the system controller configured to exchange at least one of an additional control signal and an additional telemetry signal with the second controller.

11. The method of claim 10, wherein the first light source is a beacon light source and the second light source is a marker light source.

12. The method of claim 11 further comprising:
arranging the first light source above the second light source in a structure supporting the power line cable.

13. The method of claim 10 further comprising:
coupling a first isolation impedance to the power line cable between the power supply and the power line cable, the first isolation impedance configured to isolate the power supply when the system controller provides at least one control and telemetry signal to at least one of the first and the second light sources; and
coupling a second isolation impedance to the power line cable between the system controller and the power line cable, the second isolation impedance configured to isolate the controller.

14. The method of claim 13 further comprising:
coupling the system controller to a third transceiver, said second isolation impedance being a capacitor configured to isolate the third transceiver from the power supply.

15. The method of claim 10, wherein the control and telemetry signals include at least one of:
a voltage level, a current level, a temperature level, a flash rate, an intensity level, and a day or night status indicator associated with at least one of the first and the second light sources.

16. The method of claim 13 further comprising:
coupling a third isolation impedance between the first controller and the power line cable;
coupling a fourth isolation impedance between the first transceiver and the power line cable;
coupling a fifth isolation impedance between the second controller and the power line cable; and
coupling a sixth isolation impedance between the second transceiver and the power line cable.

17. The method of claim 9 further comprising:
providing direct current (DC) power to the first light source over the power line cable.

18. A method of operating an obstruction lighting and power line communication system, the method comprising:
providing a first controller coupled to and configured to control a first light source;
providing a first transceiver associated with the first light source and configured to transmit and receive telemetry data signals associated with the first light source;
providing a power line cable coupling the first controller and the first transceiver;
providing a power supply coupled to the power line cable and configured to provide power to the first light source over the power line cable;
providing a system controller configured to exchange at least one of a control signal and a telemetry signal with the first controller over the power line cable;
providing a second controller coupled to and configured to control a second light source;
providing a second transceiver associated with the second light source and configured to transmit and receive telemetry data signals associated with the second light source, the power line cable coupling the second controller and the second transceiver, the power supply configured to provide power to the second light source over the power line cable, and the system controller configured to exchange at least one of an additional control signal and an additional telemetry signal with the second controller;
coupling a first isolation impedance to the power line cable between the power supply and the power line cable, the first isolation impedance configured to isolate the power supply when the system controller provides at least one control and telemetry signal to at least one of the first and the second light sources; and
coupling a second isolation impedance to the power line cable between the system controller and the power line cable, the second isolation impedance configured to isolate the controller.

* * * * *